United States Patent
Das

(10) Patent No.: US 11,237,860 B2
(45) Date of Patent: Feb. 1, 2022

(54) COMMAND-BASED PROCESSING OF REAL-TIME VIRTUALIZED JOBS

(71) Applicant: Red Hat, Inc., Raleigh, NC (US)

(72) Inventor: Bandan Das, Wakefield, MA (US)

(73) Assignee: Red Hat, Inc., Raleigh, NC (US)

(*) Notice: Subject to any disclaimer, the term of this patent is extended or adjusted under 35 U.S.C. 154(b) by 210 days.

(21) Appl. No.: 16/229,897

(22) Filed: Dec. 21, 2018

(65) Prior Publication Data

US 2020/0201663 A1 Jun. 25, 2020

(51) Int. Cl.
*G06F 9/455* (2018.01)
*G06F 9/48* (2006.01)
*G06F 9/50* (2006.01)

(52) U.S. Cl.
CPC .......... *G06F 9/45558* (2013.01); *G06F 9/455* (2013.01); *G06F 9/45533* (2013.01); *G06F 9/48* (2013.01); *G06F 9/4806* (2013.01); *G06F 9/4837* (2013.01); *G06F 9/4843* (2013.01); *G06F 9/4881* (2013.01); *G06F 9/50* (2013.01); *G06F 9/5005* (2013.01);
(Continued)

(58) Field of Classification Search
CPC ... G06F 9/455; G06F 9/48; G06F 9/50; G06F 9/45558; G06F 9/4837; G06F 9/45533; G06F 2009/45566; G06F 2009/45579; G06F 9/4806; G06F 9/4843; G06F 9/4881; G06F 9/5005; G06F 9/5027; G06F 9/5038; G06F 2009/4556
See application file for complete search history.

(56) References Cited

U.S. PATENT DOCUMENTS 9,483,301 B2 11/2016 Tsirkin
9,983,908 B1 5/2018 Cropper et al.
(Continued)

FOREIGN PATENT DOCUMENTS

CN 107797895 A 3/2018
WO 2017/049584 A1 3/2017

OTHER PUBLICATIONS

Amsden et al, "VMI: An Interface for Paravirtualization", Proceedings of the Linux Symposium, vol. 2, Jul. 19-22, 2006, pp. 3-18 (Year: 2006).*

(Continued)

*Primary Examiner* — Charles M Swift
(74) *Attorney, Agent, or Firm* — Kilpatrick Townsend & Stockton LLP

(57) ABSTRACT

Certain aspects and feature provide a host hypervisor that includes and advertises a virtual machine function that directs the host hypervisor to execute the next job with real-time priorities. A processing device can execute an application in a nested virtual machine, where the application includes at least one code section that relies on or makes use of real-time prioritized resources of the processing device. The processing device recognizes a virtual machine function call in response to the application determining that a code section using real-time prioritized resources is to be executed. The virtual machine function serves as a command that directs a host hypervisor to execute the next job (the next section of code to be executed) with real-time priorities. The processing device executes the code section in a real-time thread in response to the virtual machine function being called.

17 Claims, 4 Drawing Sheets

(52) U.S. Cl.
CPC .......... G06F 9/5027 (2013.01); G06F 9/5038 (2013.01); *G06F 2009/45566* (2013.01); *G06F 2009/45579* (2013.01)

(56) References Cited

U.S. PATENT DOCUMENTS

| | | | |
|---|---|---|---|
| 2003/0037089 A1* | 2/2003 | Cota-Robles | G06F 9/45558 718/1 |
| 2010/0115513 A1* | 5/2010 | Moriki | G06F 9/45558 718/1 |
| 2011/0072428 A1* | 3/2011 | Day, II | G06F 9/45558 718/1 |
| 2013/0145363 A1* | 6/2013 | Eidus | G06F 9/4555 718/1 |
| 2016/0147555 A1* | 5/2016 | Hepkin | G06F 12/1009 718/1 |
| 2017/0024231 A1* | 1/2017 | Riel | G06F 9/5038 |
| 2017/0262306 A1* | 9/2017 | Wang | G06F 9/5027 |
| 2018/0308196 A1 | 10/2018 | Ray et al. | |
| 2020/0081737 A1* | 3/2020 | Peter | G06F 9/3836 |

OTHER PUBLICATIONS

LeVasseur et al, "Pre-Virtualization: Slashing the Cost of Virtualization", University of Karlsruhe, Germany, Nov. 2005, pp. 1-14 plus cover page (Year: 2005).*

Li, W., et al., "Reducing World Switches in Virtualized Environment with Flexible Cross-world Calls," Shanghai Key Laboratory of Scalable Computing and Systems Shanghai Jiao Tong University, Jun. 13-17, 2015, https://trustkernel.com/uploads/pubs/CrossOver_ISCA2015.pdf.

Wu, S., et al., "Poris: A Scheduler for Parallel Soft Real-Time Applications in Virtualized Environment," Member, Senior Member IEEE, Jan. 2015, https://www.researchgate_net/publication/276663175_Poris_A_Scheduler_for_Parallel_Soft_Real-Time_Applications_in_Virtualized_Enviroment?enrichId=rgreq-6766b765cde05cef29a89cc325124951-XXX&enrichSource=Y292ZXJQYWdlOzl3NiY2MzE3NTtBUzovNTk4MTQ0Mzc2ODMyMDBAMTQzODk1NTk5NzY4OA%3D%3D&el=1_x_3&_esc=publicationCoverPdf.

* cited by examiner

COMMAND-BASED PROCESSING OF REAL-TIME VIRTUALIZED JOBS

TECHNICAL FIELD

The present disclosure relates generally to virtual machines. More specifically, but not by way of limitation, this disclosure relates to managing real-time processing priorities for applications running in a nested virtual machine.

BACKGROUND

Virtualization may be used to provide some physical components as logical objects in order to allow running various software modules, for example, multiple operating systems, concurrently and in isolation from other software modules, on a computing device or a collection of connected computing devices. Virtualization may allow, for example, for consolidating multiple physical servers into one physical server running multiple guest virtual machines in order to improve the hardware utilization rate.

Virtualization may be achieved by running a software layer, often referred to as a hypervisor, to manage processor resources allocated to guest virtual machines. A guest virtual machine may itself provide virtual machines and therefore may include its own hypervisor. The top-level hypervisor is often referred to as the host hypervisor and a hypervisor for a nested virtualization environment can be referred to as a nested hypervisor.

A hypervisor may virtualize the physical layer and provide interfaces between the underlying hardware and guest virtual machines and any guest operating systems. The hypervisor can use these interfaces to manage resources given to applications running on a guest virtual machine.

DETAILED DESCRIPTION

Figure 1:
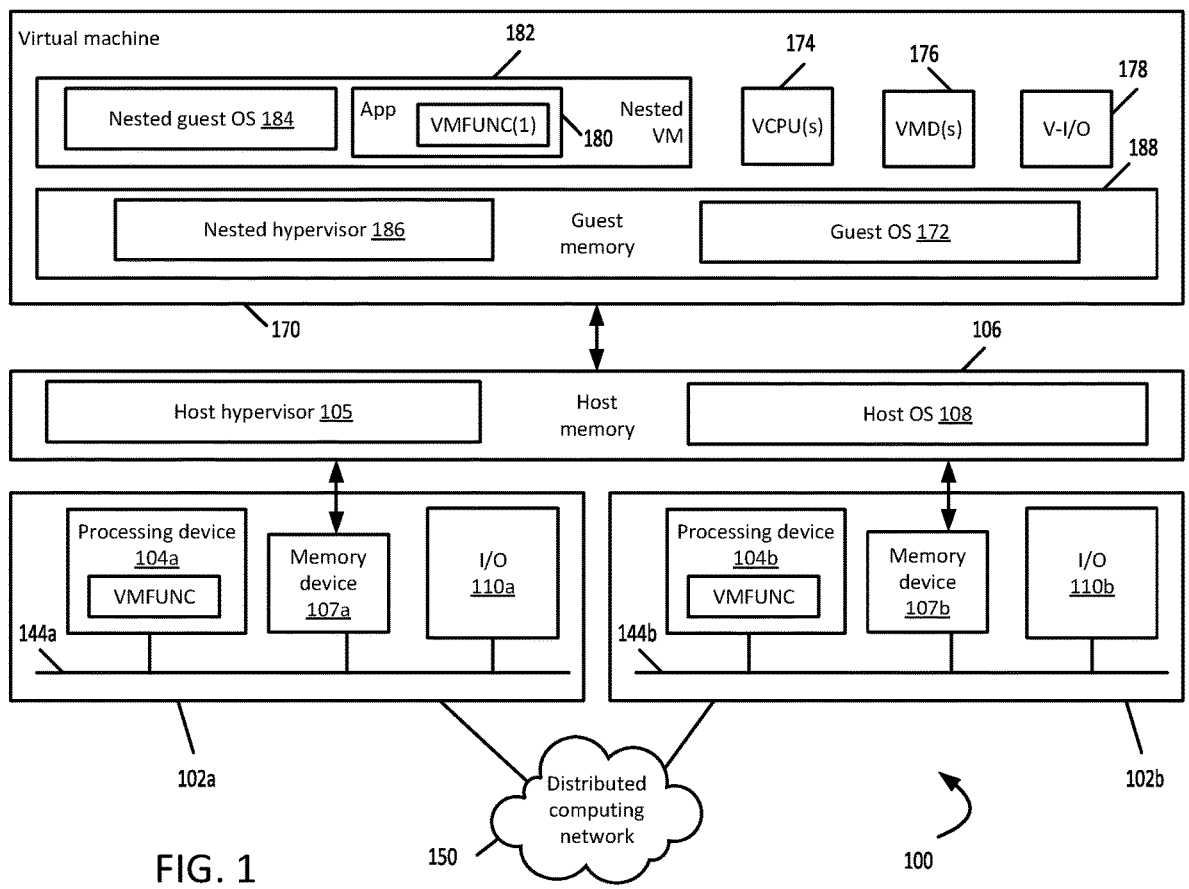
FIG. 1 is a block diagram of an example of a system that provides command-based processing of virtualized jobs that make use of real-time guarantees according to some aspects of the disclosure.

Real-time guarantees in virtual machines typically require configuration in advance to isolate one or more host CPU cores, set scheduling policies on those cores, and pin virtual CPU threads to the isolated cores. While this configuration takes some time and effort, it is manageable with a first-level guest host running in a virtual machine. However, when one or more additional levels of nested virtualization are added as in the case of nested virtual machines, the planning and configuration for providing real-time guaranteed resources to an application or job running in a nested virtual machine is so complex, difficult, and time consuming that running a real-time application in a nested virtual machine is usually avoided.

Certain aspects and feature of this disclosure provide a host hypervisor that advertises a virtual machine function to an application running under nested hypervisor. The virtual machine function directs the host hypervisor to execute the next job with real-time priorities, without having been configured in advance to detect the execution of a real-time job and follow certain scheduling policies, use certain cores, and the like.

In some examples, a processing device executes an application in a nested virtual machine. The application includes at least one code section that makes use of real-time prioritized resources of the processing device. The processing device recognizes a virtual machine function call from the application when a code section that uses real-time prioritized resources is to be executed. The function call directs a host hypervisor to execute the next job (the next section of code to be executed) with an increased level of priority relative to at least one other code section in the application. The processing device executes the code section in a real-time thread running on the processing device in response to the virtual machine function being called.

In some examples, when the processing device recognizes the virtual machine function, processing exits execution in the nested virtual machine and the processing device determines if the virtual machine function is valid. If the virtual machine function is valid, the processing device can then run the real-time thread using a bounded work queue. In some examples, the application calls the virtual machine function by loading data into registers of the processing device. The data can include a command corresponding to the virtual machine function, an address of data corresponding to the at least one code section making use of real-time prioritized resources, and a function pointer.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 that provides command-based processing of virtualized jobs that can make use of real-time processing guarantees according to some aspects of the disclosure. More specifically, the system 100 includes two computing devices, 102a and 102b, that implement nodes in a distributed computing network 150. A computing device 102a or 102b can execute software as defined below, which causes the computing device to perform the tasks of providing a host hypervisor in host memory 106 that resides in either or both of memory devices 107a and 107b, connected to processing devices 104a and 104b, respectively. Host memory 106 also includes host operating system (OS) 108. Computing devices 102a and 102b in FIG. 1 each include an input/output (I/O) module or modules 110a or 110b, respectively. A bus or interconnect 144a or 144b is also provided to allow for inter- and intra-device communications using, for example, I/O module 110a or 110b, respectively. An I/O module can include a network interface (not shown), which in turn communicates with peer nodes through distributed computing network 150.

Still referring to FIG. 1, system 100 runs a virtual machine 170 by executing the host hypervisor 105 and host OS 108. The host hypervisor 105 virtualizes the physical layer, including processors, memory, and I/O devices, and presents this virtualization to the virtual machine 170 as devices, including virtual processors, virtual memory devices, and/or virtual I/O modules. Virtual machine 170 may run on any type of dependent, independent, and compatible, applications on the underlying hardware and host OS. In this example, the virtual machine 170 is executing a guest operating system (guest OS) 172, which may utilize underlying virtual processing devices, each also referred to herein as a virtual central processing unit (VCPU) 174, a virtual memory device (VMD) or virtual memory devices 176, and a virtual I/O module (V-I/O) 178. In this example, an application 180 is running in a nested virtual machine 182 under guest nested guest OS 184, which is supervised by nested hypervisor 186. Nested hypervisor 186 and guest OS 172 run in guest memory 188.

Processor virtualization may be implemented by the host hypervisor 105 scheduling time slots on one or more physical processors such that from the guest operating system's perspective, those time slots are scheduled on a virtual processor 174. The nested hypervisor 186 in FIG. 1 can virtualize a layer, including processors, memory, and I/O devices, and present this virtualization to virtual machine 170 as devices in much the same way as host hypervisor 105 can virtualize a layer, including processors, memory, and I/O devices, and present this virtualization to the host and the host OS 108.

Staying with FIG. 1, processing device 104a and processing device 104b each can choose to advertise a mechanism for guest applications to interact with the host hypervisor, in this case, VMFUNC. An application running in a virtual machine or a nested virtual machine, such as application 180 running under nested guest OS 184 (and supervised by nested hypervisor 186) can invoke VMFUNC to access built-in features of the processing device related to running virtual machines. The host hypervisor does not inform the nested hypervisor of the function call although it could potentially. The nested hypervisor role is only to advertise the function in the virtual CPU it presents to its guest if it decides that the nested guest application can use the feature. In checking the validity of the VMFUNC call, the host hypervisor can check whether the nested hypervisor has allowed the guest to execute VMFUNC by peeking at the nested VCPUs.

The virtual machine function VMFUNC in this example includes an argument. When the virtual machine function is invoked, the specific argument used is interpreted by the host hypervisor 105 as a command to execute the next section of application code (the next execution job) with guaranteed real-time priorities, regardless of how many nested virtual machines and nested hypervisors are running. In this example, host hypervisor 105 and application 180 are configured to recognize VMFUNC with an argument value of one as the command to execute the next section of application code with guaranteed real-time priorities. However, the command can take any form, one based on a function or not. Real-time priorities are guaranteed on a best effort basis (especially for guest environments) since the host OS might have to take care of critical operations on the host itself in certain situations (e.g. system management interrupts, SMIs).

Figure 2:
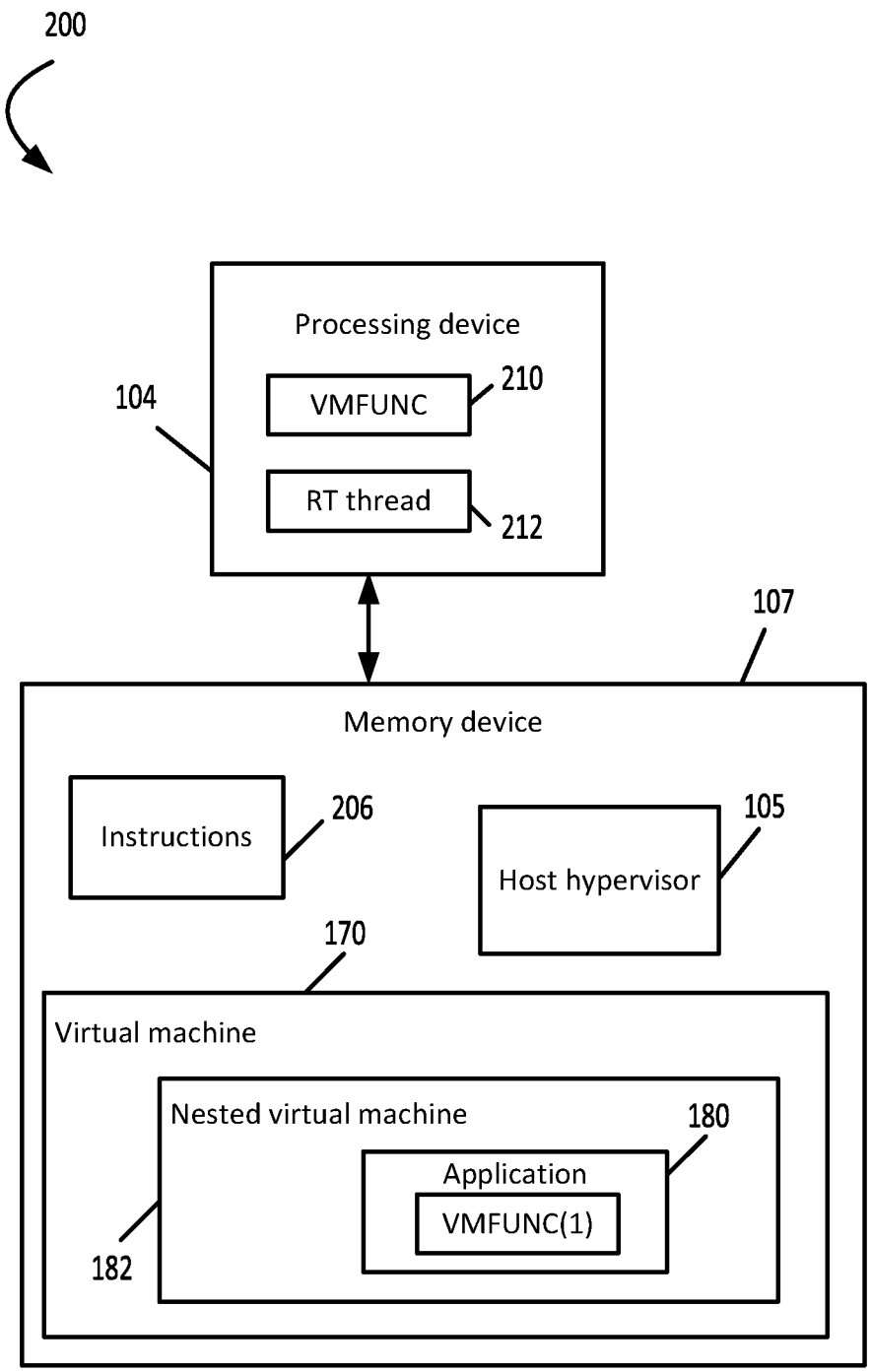
FIG. 2 is a block diagram of another example system that provides command-based processing of virtualized jobs that make use of real-time guarantees according to some aspects of the disclosure.

FIG. 2 is a block diagram of another example of a system that provides real-time guarantees of processing priority to virtualized jobs according to some aspects of the disclosure. The system 200 includes the processing device 104. Processing device 104 can execute computer program code, also referred to as instructions or program code instructions, for performing operations related to executing hypervisors and managing real-time execution for applications running in a nested virtual machine. Processing device 104 is communicatively coupled to the memory device 107. The processing device 104 can include one processing device or multiple processing devices. Non-limiting examples of the processing device 104 include a field-programmable gate array (FPGA), an application-specific integrated circuit (ASIC), a microprocessor, etc. The processing device 104 can execute one or more operations for running host hypervisor 105 as directed by program code instructions 206 stored in the memory device 107. Computer program code instructions 206 can include executable instructions to cause host hypervisor 105 to provide processor virtualization by scheduling time slots on physical processor 104 such that from a guest operating system's perspective, those time slots are scheduled on a virtual processor.

In the example of FIG. 2, host hypervisor 105 manages real-time execution for an application 180 running in a nested virtual machine 182 within virtual machine 170. Processing device 104 in some aspects includes a built-in virtual machine function 210, VMFUNC. Application 180 can invoke VMFUNC to access built-in features of the processing device. The host hypervisor does not inform the nested hypervisor of the function call. The nested hypervisor role is only to advertise the function in the virtual CPU it presents to its guest if it decides that the nested guest application can use the feature. The virtual machine function VMFUNC in some aspects includes an argument value of one, interpreted by the host hypervisor 105 as a command to execute the next section of application code (the next execution job) with guaranteed real-time priorities by using real-time (RT) thread 212. In some aspects, host hypervisor 105 runs a real-time thread on each core of processing device 104. When no virtual machines are running, these threads are either idle or can be used for other jobs running for regular applications that are not hosted in a virtual machine.

Still referring to FIG. 2, memory device 107 can include one memory device or multiple memory devices. The memory device 107 can be non-volatile and may include any type of memory device that retains stored information when powered off. In some examples, at least some of the memory device can include a non-transitory computer-readable medium from which the processing device 104 can read instructions 206. A computer-readable medium can include electronic, optical, magnetic, or other storage devices capable of providing the processing device with computer-readable instructions 206 or other program code. Non-limiting examples of the memory device 107 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions. Although FIGS. 1 and 2 depict a certain arrangement of components for illustrative purposes, other examples can include any number and combination of these components arranged in any suitable configuration.

Figure 3:
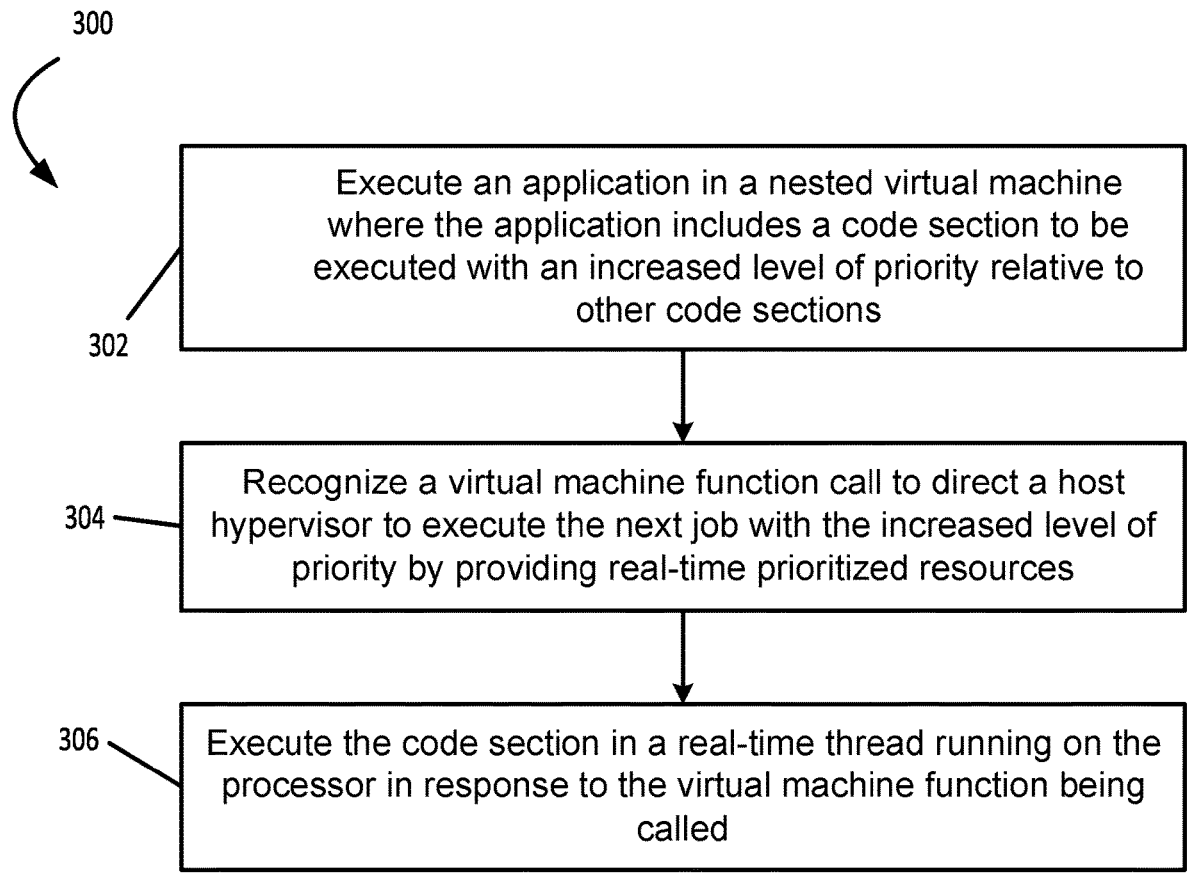
FIG. 3 is a flowchart of an example of a process for providing command-based processing of virtualized jobs that make use of real-time guarantees according to some aspects of the disclosure.

In some examples, a processing device (e.g., processing device 104) can perform one or more of the operations shown in FIG. 3 to provide real-time guarantees of processing priority to virtualized jobs according to some aspects of the disclosure. In other examples, the computing device can implement more operations, fewer operations, different operations, or a different order of the operations depicted in FIG. 3. Process 300 of FIG. 3 is described below with reference to components discussed above.

At block 302, a processing device 104 executes an application 180 in a nested virtual machine 182, where the application includes a code section that uses real-time prioritized resources and therefore is to be executed with an increased level of priority relative to other code sections. At block 304, host hypervisor 105 recognizes a virtual machine function call for processing device 104 to direct the host hypervisor 105 to execute the next job using an increased level of priority relative to at least one other code section. The increased priority can be provided by executing the next job with real-time prioritized resources. At block 306, the processing device 104 responds to the virtual machine function call by prioritizing execution of the code section above other jobs to ensure that the code section is executed next. The processor then executes the code section via a real-time thread 212 running on processing device 104 to provide guaranteed real-time resources.

Another example of the concepts described herein is described below with reference to FIG. 4. At block 402, a processing device executes an application needing real-time guarantees in a nested virtual machine being managed by a nested hypervisor, such as nested virtual machine 182. At block 404, the host hypervisor advertises the function availability to the application. This function command can be a built-in function that when called, is recognized as a command to the host hypervisor to run the next job with increased priority, for example, real-time processing guarantees. An example of such a function is VMFUNC(1), previously described. At block 406, the application loads data associated with the function call into the processor's registers. For example, the application can load the function call, the relevant data address for the code segment using real-time guarantees, and a function pointer into general purpose registers of the processing device. As a more specific example, when the application needs to run such a section of code with real-time priorities on an Intel® processor using the function VMFUNC, the application can load the function into register RAX, the address of the data section into register RBX and the function pointer into register RCX. There may be additional arguments for the function that invoke other commands or processes. For example, VMFUNC with an argument of zero, VMFUNC (0), is used in some processors for extended page table pointer (EPTP) switching. Any unused argument can be used to implement an example of this disclosure. At block 408 the application calls the function, and at block 410 processing exits from control by the application and shifts back to control of the host hypervisor. Any nested hypervisors ignore the command.

Figure 4:
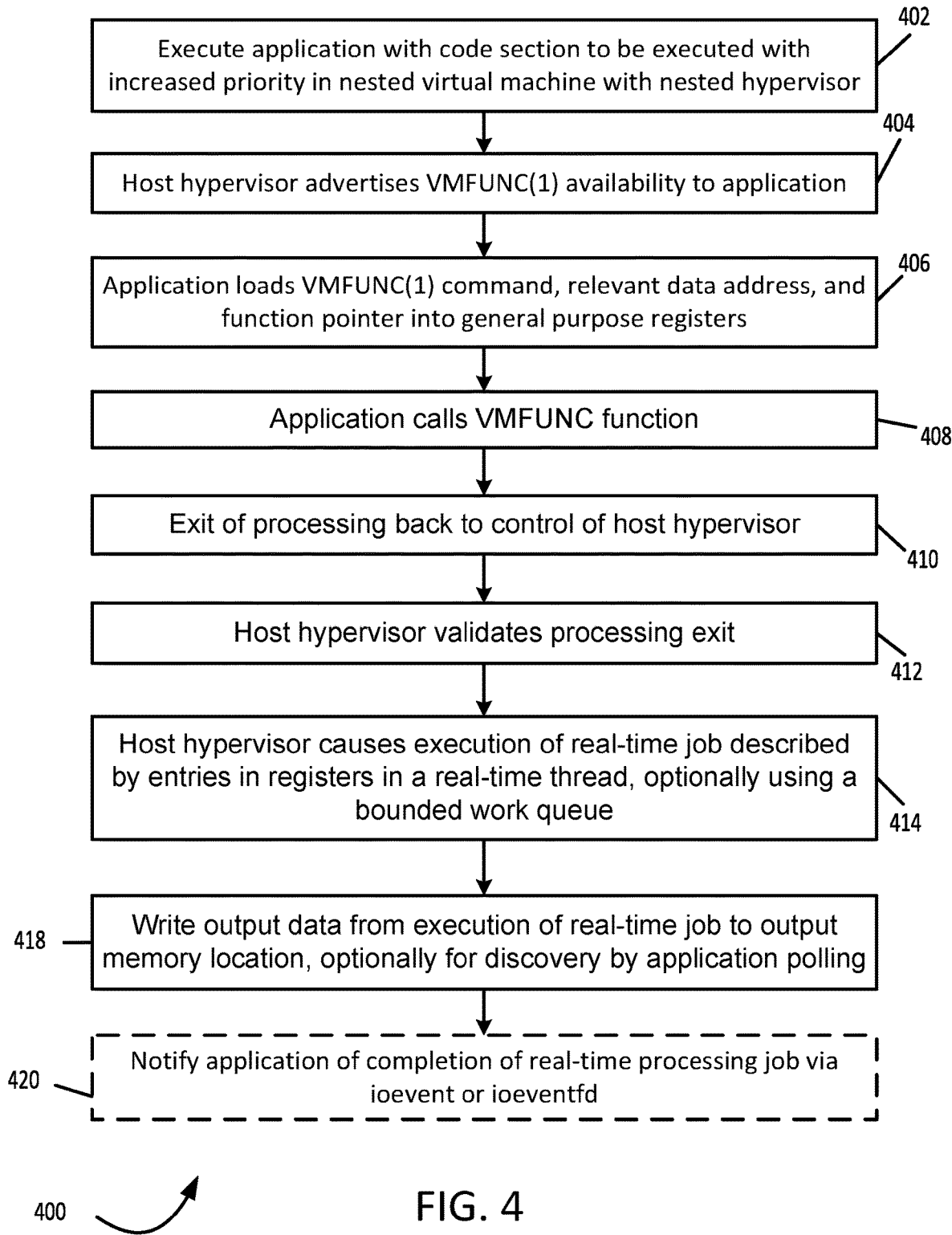
FIG. 4 is a flowchart of another example of a process for providing command-based processing of virtualized jobs that make use of real-time guarantees according to some aspects of the disclosure.

Still referring to FIG. 4, at block 412, the host hypervisor validates the processing exit of block 408, making sure that the function call is in a valid format. Once the host hypervisor inspects the validity of the virtual machine exit, it directs the processing device at block 414 to execute the real-time job specified by the function pointer and other register entries. The host hypervisor can run the job on the processing core currently being used by the application on the most-recently used real-time thread or can run the job on another real-time thread on the same core if the existing thread already has a specified, permitted number of real-time jobs running. At block 418, the processing device writes output data from execution of the real-time job to an output memory location configured to be polled by the application. The application can learn of the completion of the job by polling the output memory location for output data. Optionally, the processing device can issue a notification at block 420 of completion of execution, for example, using an ioevent or an ioeventfd function.

No changes are required in any nested hypervisor in order to implement command-based processing of virtualized jobs as described herein. A real-time application is modified to adapt its operation to the command mechanism. Most applications that take advantage of real-time guarantees are designed to be modified so that real-time CPU intensive sections of the application can be modified for future development purposes. An existing host hypervisor can run a real-time thread on each host CPU core. An existing hypervisor implementation can be modified to recognize the function argument specifying the commend and to use bounded work queues for real-time threads when the function call is invoked.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "top," and "bottom" when referring to the physical arrangement of elements in a drawings are for reference only to guide the reader and are not meant to imply any required order or arrangement of the elements pictured.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
a processing device; and
a memory device including instructions that are executable by the processing device for causing the processing device to perform operations comprising:
executing an application using a nested guest operating system in a nested virtual machine, wherein the application includes a code section to be executed using a real-time prioritized resource as compared to at least one other code section in the application;
providing a virtual central processing unit (VCPU) to the application, the VCPU including a virtual machine function to execute the code section with the real-time prioritized resource;
detecting a command to the virtual machine function in the VCPU from the application using the nested guest operating system, wherein the command is invokable to cause the processing device to execute the code section with the real-time prioritized resource; and
in response to the command, executing the code section in a real-time thread to provide the real-time prioritized resource.

2. The system of claim 1, wherein the operations further comprise notifying the application of completion of the executing of the code section.

3. The system of claim 1, wherein detecting the command comprises:
   exiting execution in the nested virtual machine; and
   determining a validity of the command.

4. The system of claim 1, wherein the operations further comprise writing output data to an output memory location configured to be polled by the application.

5. The system of claim 4, wherein the memory device further includes instructions that are executable by the processing device to poll the output memory location for the output data to determine when execution of the code section is complete.

6. The system of claim 1, wherein the memory device further includes instructions that are executable by the processing device to implement the command at least in part by loading an address of data corresponding to the code section and a function pointer into registers in the processing device.

7. A method comprising:
   executing, by a processing device, an application using a nested guest operating system in a nested virtual machine, wherein the application includes a code section to be executed using a real-time prioritized resource as compared to at least one other code section in the application;
   providing, by the processing device, a virtual central processing unit (VCPU) to the application, the VCPU including a virtual machine function to execute the code section with the real-time prioritized resource;
   detecting, by the processing device, a command to the virtual machine function in the VCPU from the application using the nested guest operating system, wherein the command is invoked to cause the processing device to execute the code section with the real-time prioritized resource;
   and
   in response to the command, executing, by the processing device, the code section in a real-time thread to provide the real-time prioritized resource.

8. The method of claim 7 further comprising notifying the application of completion of the executing of the code section.

9. The method of claim 7 wherein detecting the command comprises:
   exiting execution in the nested virtual machine; and
   determining a validity of the command.

10. The method of claim 7 further comprising loading an address of data corresponding to the code section, and a function pointer into registers in the processing device.

11. The method of claim 7 further comprising polling a memory location for output data to determine when execution of the code section is complete.

12. A non-transitory computer-readable medium comprising program code that is executable by a processing device for causing the processing device to:
   execute an application using a nested guest operating system in a nested virtual machine, wherein the application includes a code section to be executed using a real-time prioritized resource as compared to at least one other code section in the application;
   provide a virtual central processing unit (VCPU) to the application, the VCPU including a virtual machine function to execute the code section with the real-time prioritized resource;
   detect a command to the virtual machine function in the VCPU from the application using the nested guest operating system, wherein the command is invokable to cause the processing device to execute the code section with the real-time prioritized resource; and
   in response to the command, execute the code section in a real-time thread to provide the real-time prioritized resource.

13. The non-transitory computer-readable medium of claim 12 wherein program code is executable to further cause the processing device to notify the application of completion of the executing of the code section.

14. The non-transitory computer-readable medium of claim 12 wherein detecting the command comprises:
   exiting execution in the nested virtual machine; and
   determining a validity of the command.

15. The non-transitory computer-readable medium of claim 12 wherein program code is executable to further cause the processing device to write output data to an output memory location configured to be polled by the application.

16. The non-transitory computer-readable medium of claim 15 wherein program code is executable to further cause the processing device to poll the output memory location for the output data to determine when execution of the code section is complete.

17. The non-transitory computer-readable medium of claim 12 wherein the program code is executable to further cause the processing device to load an address of data corresponding to the code section and a function pointer into registers in the processing device.

* * * * *